(12) United States Patent
Barraza et al.

(10) Patent No.: US 7,153,903 B1
(45) Date of Patent: Dec. 26, 2006

(54) CARBON NANOTUBE-FILLED COMPOSITES PREPARED BY IN-SITU POLYMERIZATION

(75) Inventors: Harry J. Barraza, Norman, OK (US); Leandro Balzano, Norman, OK (US); Francisco Pompeo, La Plata (AR); Olga Lucia Rueda, Norman, OK (US); Edgar A. O'Rear, Norman, OK (US); Daniel E. Resasco, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 371 days.

(21) Appl. No.: 10/464,041

(22) Filed: Jun. 18, 2003

Related U.S. Application Data (60) Provisional application No. 60/390,129, filed on Jun. 19, 2002.

(51) Int. Cl.
*C08K 3/04* (2006.01)
(52) U.S. Cl. ............. 524/847; 524/495; 524/496
(58) Field of Classification Search ........ 524/495–496, 524/847
See application file for complete search history.

(56) References Cited

U.S. PATENT DOCUMENTS

| | | | |
|---|---|---|---|
| 3,746,657 A | 7/1973 | Miller et al. | |
| 4,456,694 A | 6/1984 | Blaskie et al. | |
| 4,574,120 A | 3/1986 | Thompson | |
| 4,663,230 A | 5/1987 | Tennent | |
| 5,165,909 A | 11/1992 | Tennent et al. | |
| 5,227,038 A | 7/1993 | Smalley et al. | |
| 5,300,203 A | 4/1994 | Smalley | |
| 5,405,996 A | 4/1995 | Suzuki et al. | |
| 5,482,601 A | 1/1996 | Ohshima et al. | |
| 5,543,378 A | 8/1996 | Wang | |
| 5,556,517 A | 9/1996 | Smalley | |
| 5,560,898 A | 10/1996 | Uchida et al. | |
| 5,578,543 A | 11/1996 | Tennent et al. | |
| 5,587,141 A | 12/1996 | Ohshima et al. | |
| 5,591,312 A | 1/1997 | Smalley | |
| 5,603,907 A | 2/1997 | Grochowski | |
| 5,641,466 A | 6/1997 | Ebbesen et al. | |
| 5,648,056 A | 7/1997 | Tanaka | |
| 5,695,734 A | 12/1997 | Ikazaki et al. | |
| 5,698,175 A | 12/1997 | Hiura et al. | |
| 5,707,916 A | 1/1998 | Snyder et al. | |
| 5,744,235 A | 4/1998 | Creehan | |
| 5,753,088 A | 5/1998 | Olk | |
| 5,773,834 A | 6/1998 | Yamamoto et al. | |
| 5,780,101 A | 7/1998 | Nolan et al. | |
| 5,814,290 A | 9/1998 | Niu et al. | |
| 5,877,110 A | 3/1999 | Snyder et al. | |
| 5,965,267 A | 10/1999 | Nolan et al. | |
| 5,985,232 A | 11/1999 | Howard et al. | |
| 5,997,832 A | 12/1999 | Lieber et al. | |
| 6,426,134 B1 | 7/2002 | Lavin et al. | |
| 6,599,961 B1 | 7/2003 | Pienkowski et al. | |
| 6,689,835 B1 * | 2/2004 | Amarasekera et al. | ...... 524/495 |
| 6,782,154 B1 * | 8/2004 | Zhao et al. | .................... 385/16 |
| 6,900,264 B1 * | 5/2005 | Kumar et al. | ................ 524/495 |
| 6,905,667 B1 * | 6/2005 | Chen et al. | .............. 423/447.1 |
| 7,008,563 B1 * | 3/2006 | Smalley et al. | .............. 252/511 |
| 2001/0031900 A1 | 10/2001 | Margrave et al. | |
| 2002/0001620 A1 | 1/2002 | Pienkowski et al. | |
| 2002/0127169 A1 | 9/2002 | Smalley et al. | |
| 2002/0165091 A1 | 11/2002 | Resasco et al. | |
| 2003/0077515 A1 | 4/2003 | Chen et al. | |
| 2003/0089893 A1 | 5/2003 | Niu et al. | |
| 2003/0180526 A1 | 9/2003 | Winey et al. | |
| 2004/0009346 A1 | 1/2004 | Jang et al. | |
| 2004/0028859 A1 | 2/2004 | LeGrande et al. | |

FOREIGN PATENT DOCUMENTS

| | | |
|---|---|---|
| EP | 03 73 9258 | 6/2006 |
| WO | WO 97/09272 | 3/1997 |
| WO | WO 98/39250 | 9/1998 |
| WO | WO 98/42620 | 10/1998 |
| WO | WO 00/17102 | 3/2000 |
| WO | PCT/US00/15362 | 10/2000 |
| WO | WO 00/73205 | 12/2000 |
| WO | WO 02/076903 A2 | 10/2002 |
| WO | WO 03/038837 A1 | 5/2003 |
| WO | PCT/US02/23155 | 7/2003 |
| WO | PCT/US03/19664 | 3/2004 |

OTHER PUBLICATIONS

Alvarez, et al., "Synergism of Co and Mo in the catalytic production of single-wall carbon nanotubes by decomposition of CO", *Elsevier Science Ltd.*, Carbon 39 (2001), pp. 547-558.

Anderson et al., "50 nm Polystyrene Particles via Miniemulsion Polymerization", Macromolecules, American Chemical Society, vol. 35, pp. 574-576, 2002.

(Continued)

*Primary Examiner*—Peter Szekely
(74) *Attorney, Agent, or Firm*—Dunlap, Codding & Rogers, P.C.

(57) ABSTRACT

A method of forming carbon nanotube-filled composites using miniemulsion polymerization. The carbon nanotubes are preferably single-walled carbon nanotubes. The carbon nanotubes are highly dispersed within and associated with the polymer comprising the composite.

32 Claims, 8 Drawing Sheets

OTHER PUBLICATIONS

Bandow et al., "Effect of the Growth Temperature on the Diameter Distribution and Chirality of Single-Wall Carbon Nanotubes", *The American Physical Society*, Physical Review Letters, vol. 80, No. 17, (1998), pp. 3779-3782.

Bethune et al. "Cobalt-Catalysed Growth of Carbon Nanotubes with Single-Atomic-Layer Walls", Letters to Nature, vol. 363, pp. 605-607, Jun. 17, 1993.

Bower et al., "Deformation of Carbon Nanotubes in Nanotube-Polymer Composites", Applied Physics Letters, vol. 74, No. 22, pp. 3317-3319, May 31, 1999.

V. Brotons et al., "Catalytic influence of bimetallic phases for the synthesis of single-walled carbon nanotubes", Journal of Molecular Catalysis, A: Chemical, vol. 116, pp. 397-403, Dec. 16, 1997.

Cadek et al., "Mechanical and Thermal Properties of CNT and CNF Reinforced Polymer Composites", Structural and Electronic Properties of Molecular Nanostructures, American Institute of Physics, pp. 562-565, 2002.

Cassell et al., "Large Scale CVD Synthesis of Single-Walled Carbon Nanotubes", J. Phys. Chem. B., American Chemical Society, vol. 103, pp. 6484-6492, 1999.

Chaturvedi et al., "Properties of pure and sulfided NiMoO4 and CoMoO4 catalysts: TPR, XANES and time-resolved XRD studies", Database Accession No. EIX9904449081 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260-267, 1998.

Chen et al., "Growth of carbon nanotubes by catalytic decomposition of $CH_4$ or CO on a Ni-MgO catalyst", Carbon vol. 35, No. 10-11, pp. 1495-1501, 1997.

Cheng et al., "Bulk Morphology and Diameter Distribution of Single-Walled Carbon Nanotubes Synthesized by Catalytic Decomposition of Hydrocarbons", Chemical Physics Letters, vol. 289, pp. 602-610, Jun. 19, 1998.

Cheng et al., "Large-Scale and Low-Cost Synthesis of Single-Walled Carbon Nanotubes by the Catalytic Pyrolysis of Hydrocarbons", Applied Physics Letters, vol. 72, No. 25, pp. 3282-3284, Jun. 22, 1998.

Dai et al., "Single-Wall Nanotubes Product By Metal-Catalyzed Disproportionation of Carbon Monoxide", Chemical Physics Letters, vol. 260, pp. 471-475, Sep. 27, 1996.

Database, Accession No. 1999-366878, Cano, "Canon KK", XP-002149235, May 25, 1999.

De Boer et al., "The cobalt-molybdenum interaction in $CoMo/SiO_2$ catalysts: A CO-oxidation study", *Elsevier Science Ltd.*, Solid State Ionics 63-65 (1995), pp. 736-742.

Deng et al., "Hybrid Composite of Polyaniline Containing Carbon Nanotube", Chinese Chemical Letters, vol. 12, pp. 1037-1040, 2001.

Fonseca et al., "Synthesis of single-and multi-wall carbon nanotubes over supported catalysts", Applied Physics A, vol. 67, pp. 11-22, 1998.

Franco et al., "Electric and magnetic properties of polymer electrolyte/carbon black composites", Solid State Ionics 113-115, pp. 149-160, 1998.

Gaspar et al., "The influence of Cr precursors in the ethylene polymerization on $Cr/SiO_2$ catalysts", Applied Catalysis A: General, vol. 227, pp. 240-254, 2002.

Gong et al., "Surfactant-Assisted Processing of Carbon Nanotube/Polymer Composites", Chemical Material, vol. 12, pp. 1049-1052, 2000.

Govindaraj et al., "Carbon structures obtained by the disproportionation of carbon monoxide over nickel catalysts", Materials Research Bulletin, vol. 33, No. 4, pp. 663-667, 1998.

Hafner et al., "Catalytic growth of single-wall carbon nanotubes from metal particles", Chemical Physics Letters, vol. 296, pp. 195-202, 1998.

Hamon et al., "End-group and defect analysis of soluble single-walled carbon nanotubes", Chemical Physics Letters, vol. 347 pp. 8-12, 2001.

Hernadi et al., "Catalytic synthesis of carbon nanotubes using zerolite support", Elsevier Science Inc. 1996.

Hwang et al., "Carbon nanotube reinforced ceramics", Journal of Materials Chemistry, vol. 11, pp. 1722-1725, 2001.

Hyperion Catalysis International Website; http://www.fibrils.com/esd.htm;"Unique Slough Resistant SR™ Series ESD Thermoplastic Product Line Offers Reduced Particle Contamination For Demanding Electronic Applications," and Hyperion Homepage http://www.fibrils.com.

Iijima, "Helical Microtubules of Graphitic Carbon", Letters to Nature, vol. 354, pp. 56-58, Nov. 7, 1991.

Iijima et al., "Single-Shell Carbon Nanotubes of 1-nm Diameter", Letters to Nature, vol. 363, pp. 603-605, Jun. 17, 1993.

Ivanov et al., "The Study of Carbon Nanotubules Produced by Catalytic Method", Chemical Physics Letters, vol. 223, pp. 329-335, 1994.

Jin et al., "Alignment of Carbon nanotubes in a polymer matrix by mechanical stretching", Applied Physics Letters, vol. 73, No. 9, pp. 1197-1199, Aug. 31, 1998.

Journet et al., "Large-Scale Production of Single-Walled Carbon Nanotubes by the Electric-Arc Technique", Letters to Nature, vol. 338, pp. 756-758, Aug. 21, 1997.

Kitiyanan et al., "Controlled production of single-wall carbon nanotubes by catalytic decomposition of CO on bimetallic Co-Mo catalysts", Chemical Physics Letters, vol. 317, pp. 497-503, Feb. 4, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester et al., "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon Nanotubue-polystyrene composites", Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Rinzler et al., "Large-Scale Purification of Single-Wall Carbon Nanotubes: Process, Product, and Characterization," Applied Physics A, vol. 67, pp. 29-37, 1998.

Sears et al., "Raman scattering from polymerizing styrene. I. Vibrational mode analysis [a])", J. Chem. Phys., vol. 75, No. 4, pp. 1589-1598.

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Laxtexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, p. Est: 4.1, pp. A-E, Feb. 22, 2001.

Zhu et al., "Direct Synthesis of Long Single-Walled Carbon Nanotube Strands", Science, vol. 296, pp. 884-886, May 15, 2002.

Saito, et al, "Electronic structure of chiral graphene tubules," *Appl. Phys. Lett.* vol. 60, No. 18 (May 4, 1992) pp. 2204-2206.

Bahr et al., "Functionalization of Carbon Nanotubes by Electrochemical Reduction of Aryl Diazonium Salts: A Bucky Paper Electrode," *J. Am. Chem. Cos.* vol. 123 (2001) pp. 6536-6542.

Dyke et al., "Unbundled and Highly Functionalized Carbon Nanotubes from Aqueous Reactions," *NanoLetters*, vol. 3, No. 9 (2003) pp. 1215-1218.

Buffa et al., "Side-Wall Functionalization of Single-Walled Carbon Nanotubes with 4-Hydroxymethylaniline Followed by Polymerization of $\epsilon$-Caprolactone," *Macromolecules*, vol. 38, No. 20 (2005) pp. 8258-8263.

Chen G Z et al., "Carbon Nanotube and Polypyrrole Composites: Coating and Doping," *Advanced Materials*, Wiley VCH, Weinheim, De, vol. 12, No. 7, Apr. 4, 2000, pp. 522-526, XP000949760.

Deng, J., et al., "Carbon nanotube-polyaniline hybrid materials," *European Polymer Journal*, Pergamon Press Ltd. Oxford, GB, vol. 38, No. 12, Dec. 2002, pp. 2497-2501, XP004389385.

Zhijie Jia, et al., "Study on poly(methyl methacrylate)/carbon nanotube composites," *Materials science & Engineering*, Elsevier Switzerland, vol. A271, No. 1-2, Nov. 1, 1999, pp. 395-400, XP002385240.

Zhijie Jia, et al., "Effects of Carbon Nanotube on Strength and Resistivity of PMMA," *Development and Application of Materials*, (Chinese), 13 (6), Dec. 1998). (with English translation).

* cited by examiner

CARBON NANOTUBE-FILLED COMPOSITES PREPARED BY IN-SITU POLYMERIZATION

CROSS REFERENCE TO RELATED APPLICATIONS

The present application claims priority to U.S. Provisional Application 60/390,129 filed Jun. 19, 2002, which is hereby expressly incorporated by reference herein in its entirety.

STATEMENT REGARDING FEDERALLY SPONSORED RESEARCH OR DEVELOPMENT

Not applicable.

BACKGROUND

Modification of the electrical properties of polystyrene and other polymers by introduction of inorganic reinforcements (e.g., carbon black, iron powder) has been long pursued by researchers[1]. Recently, the use of multi-walled carbon nanotubes (MWNTs) has been demonstrated as more advantageous than carbon black, not only because of the need of smaller loads to reach the conductivity threshold, but also because their high aspect ratio helps create extensive networks that facilitate electron transport. Single-walled carbon nanotubes (SWNTs) have not been studied as extensively as MWNTs in applications involving conductive nanotube-filled polymers. One reason for this is that strong attractive Van der Waals forces lead them to easily aggregate, and thus, with the prior art cast techniques, it is very difficult to form conductive networks at relatively low loadings.

Additionally, the reason that engineering research aimed toward the purification, functionalization and incorporation of carbon nanotubes into polymeric matrices has been actively pursued recently is that vastly important applications, from anticorrosion paints to nanometer-thick conductive thin films, are expected to have a direct impact on a world market worth hundreds of millions of dollars. Among the challenges introduced in the fabrication of nanotube-filled polymer composites is the necessity to creatively control and make use of surface interactions between carbon nanotubes and polymeric chains in order to obtain an adequate dispersion throughout the matrix without destroying the integrity of the carbon nanotubes (NTS). Solution-evaporation methods have been the major experimental route to prepare both filled thermoplastics such as polystyrene (PS)[2], polyvinyl alcohol (PVA)[3], polyhydroxyaminoether (PHAE)[4,5], poly(m-phenylenevinylene-co-2,5-dioctyloxy-p-phenylenevinylene) (PmPV)[6], as well as epoxy thermosets[7]. Solution-casting methods have limited applicability for producing highly conductive films because SWNT composites tend to saturate at 1.2% nanotube content as the excess nanotubes aggregate[5]. In addition, most polymeric materials need a large amount of solvent to be completely solubilized and to consequently incorporate the NTs. Moreover, these solvents are known organic liquids of high toxicity such as toluene, chloroform, tetrahydrofurane (THF) or dimethyl formamide (DMF) therefore their use is to be avoided.

Recently, inorganic fillers such as carbon black[8], titanium dioxide[9], magnetite[10], calcium carbonate[9,10], and silica[11] have been encapsulated by using the technique of surfactant-enhanced miniemulsion polymerization. In miniemulsion polymerization, the inorganic filler is first dispersed in a monomer and then the mixture is subjected to conditions of high shear typical of miniemulsification. Use of oil-soluble or water-soluble radical initiators under mild temperature conditions accelerates the polymerization, originating hybrid materials with different structures, e.g., encapsulated filler; polymer core with attached inorganic particles; or a mixture of both[11]. A similar procedure to create a doped polyaniline (PANI)-Multiwall carbon nanotube composite under conditions of emulsion polymerization was done by Deng et al[12] who observed an increase in electrical conductivity of about 25 times between the PANI-NTs composite (10% load of NTs) with respect to the conductivity of the parent PANI. Another example of surfactant-aided composite fabrication employs a dispersion of carbon nanotubes in a cationic surfactant to generate co-micelles which serve as a template for the synthesis of nanotube-containing silicon oxide micro-rods[13]. However, in situ miniemulsion techniques have not been used to combine SWNTs with monomers to form SWNT-composites.

SUMMARY OF THE INVENTION

The invention described herein contemplates in one embodiment a method for producing SWNT-filled composites using an in situ polymerization process comprising the steps of: combining single-walled carbon nanotubes with a monomer in the presence or absence of a polymerization catalyst; activating the polymerization catalyst if needed; exposing the mixture to polymerization conditions thereby resulting in a polymer mixture having the single-walled carbon nanotubes highly dispersed therein; thereby forming the single-walled carbon nanotube-filled composite. The nanotubes used in the process may be purified SWNTs, or SWNTs still associated with at least a portion of the catalytic material used in the process for producing SWNTs. The polymerization catalyst used may be added to the catalyst used in the process for producing SWNTs before the production of the SWNTs or may be added to the SWNTs after their production.

In an alternative embodiment, the invention contemplates a method for producing a single-walled carbon nanotube-filled polymer composite (SWNT-filled composite) produced by a miniemulsion process comprising the steps of: combining SWNTs with an aqueous surfactant thereby forming a surfactant-nanotube mixture and forming a surfactant-nanotube dispersion therefrom; combining a polymerization initiator with the surfactant-nanotube dispersion thereby forming a surfactant-nanotube-initiator mixture and treating the surfactant-nanotube-initiator mixture to form aggregates wherein the nanotubes are highly dispersed within the surfactant-nanotube-initiator mixture; combining a monomer with a hydrophobe to form a monomer-hydrophobe mixture, and adding a polymerization catalyst thereby forming a monomer-hydrophobe-polymerization catalyst mixture; combining the surfactant-nanotube-initiator mixture with the monomer-hydrophobe-polymerization catalyst mixture thereby forming a monomer-nanotube mixture; and mixing the monomer-nanotube mixture under miniemulsion conditions for a predetermined duration forming a monomer-nanotube miniemulsion wherein polymerization occurs, thereby resulting in a polymer mixture having the single-walled carbon nanotubes highly dispersed therein, forming the single-walled carbon nanotube-filled composite. The nanotubes used in the process may be purified SWNTs, or SWNTs still associated with a catalyst material used in a process for producing SWNTs.

DETAILED DESCRIPTION OF THE INVENTION

As previously noted, the use of MWNTs has been demonstrated as more advantageous than carbon black, not only because of the need of smaller loads to reach the conductivity threshold, but also because their high aspect ratio helps create extensive networks that facilitate electron transport. SWNTs have not been studied as extensively as MWNTs in applications involving conductive nanotube-filled polymers. One reason for this is that strong attractive Van der Waals forces lead them to easily aggregate, and thus, with the prior art cast techniques, it is very difficult to form conductive networks at relatively low loadings. However, the miniemulsion polymerization technique described herein as an example of an in situ polymerization method enables SWNTs to be effectively dispersed inside the host matrix and form multiple tube—tube contacts modifying the electric response of the composite.

The present invention is therefore directed to carbon nanotube-filled composite materials and methods of production thereof. Preferably the composites comprise single-walled carbon nanotubes.

In a preferred embodiment, the method comprises the steps of combining a quantity of single-walled carbon nanotubes with a monomer and a polymerization catalyst that allows for the polymerization of the monomer in the presence of the well dispersed SWNTs thereby forming the carbon nanotube-filled composite.

In an alternative embodiment, the method comprises the steps of combining a quantity of single-walled carbon nanotubes with an aqueous surfactant to form a surfactant-nanotube mixture, sonicating the surfactant-nanotube mixture to form aggregates therein, thereby forming a surfactant-nanotube dispersion, combining a polymerization initiator with the surfactant-nanotube dispersion to form a surfactant-nanotube-initiator mixture, combining a quantity of a monomer with a quantity of a hydrophobe to form a monomer-hydrophobe mixture, combining a polymerization catalyst with the monomer-hydrophobe mixture to form a monomer-hydrophobe-polymerization catalyst mixture, combining the surfactant-nanotube-initiator mixture with the monomer-hydrophobe-polymerization catalyst mixture to form a monomer-nanotube mixture, and sonicating the monomer-nanotube mixture causing formation of a monomer-nanotube miniemulsion within which polymerization occurs thereby forming the carbon nanotube-filled composite.

For example, SWNT-PS and SWNT-SI (SWNT-styrene-isoprene copolymer composites) have been prepared herein in situ under miniemulsion polymerization conditions. AC Impedance and DC resistivity measurements performed on the SWNT-PS composites showed that nanotube content significantly modifies the electrical response of the parent matrix, and for the specific case of an 8.5% nanotube loading the resistivity value drops over ten orders of magnitude.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples, which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLES

Example 1

Preparation of Nanotube-Polystyrene Composites and Nanotube-Styrene-Isoprene Copolymer Composites SWNTs were purchased from CARBOLEX™ (batch CLAP 8256). This raw material was suspended in a 3 M $HNO_3$ solution and kept for about 10 h in reflux until the evolution of $NO_2$ vapors subsided. After this treatment, the product was vacuum-filtered, using a Teflon membrane with pore size 0.2μ(PTFE 0.2μ). The resulting solid was then thoroughly washed with deionized water until the filtrate completely lost the yellowish color initially present. The carbon content in this final product was 86 wt %, which was primarily single-walled carbon nanotubes[14].

In a preferred embodiment, SWNTs are treated and/or functionalized before they are used in the invention contemplated herein. SWNTs are suspended in deionized water to which an aqueous solution of HCl is added to cause the protonation of the oxidized groups generated during the purification step. It has been previously shown that after this treatment carboxylic groups are left on the SWNT. The ends of SWNT as well as defects on the SWNT walls are more reactive than the cylindrical wall of the nanotube. The presence of pentagons and higher curvatures than on the hexagons of the cylindrical part of the tubes make the opening in those parts of the tubes easier when they are exposed to strong oxidants such as $HNO_3$. Carboxylic groups resulting after oxidizing attacks have been observed previously in IR spectra.

To functionalize the SWNT with glucosamine, the first step is to generate the acyl chloride, which is achieved by suspending the purified SWNT in a solution of thionyl chloride ($SOCl_2$) and dimethyl formamide (DMF). The amounts used in this particular example were 20 $cm^3$ $SOCl_2$ and 1 $cm^3$ DMF per 0.1 g of SWNT. This suspension was stirred at 65° C. for 24 h. The solid was then separated by filtration and washed with anhydrous tetrahydrofuran (THF). Subsequently, it was vacuum dried at room temperature for 5 min. Finally, the solid was mixed with glucosamine (99% purity from Aldrich) dissolved in anhydrous THF, which was previously distilled and kept in the presence of Na wires to eliminate any traces of water. The mixture was then refluxed for 48 h and the solid separated by filtration with the same 0.2µ Teflon membrane filter as mentioned above. Finally, it was thoroughly washed with anhydrous THF and vacuum dried overnight. At this moment, the solid exhibited a light gray color that varied with the SWNT-to-glucosamine ratio.

Cetyltrimethylammonium bromide (CTAB) from Aldrich and sodium dodecyl sulfate (SDS) (Aldrich, 98% purity) were added to separate vessels containing deionized water. The purified carbon nanotube product was weighed and added to the surfactant solutions (which were slightly above the critical micelle concentration (cmc)) to provide nanotube concentrations of 0.6 and 1.2% weight percent. Mixing and moderate sonication (45 W) for 2 h yielded a dark surfactant-nanotube dispersion showing negligible amounts of precipitate. 0.05 grams of an oil-soluble initiator: AIBN (99% purity, Aldrich) was dissolved in 1.5 ml of pure ethanol and then mixed with 35 ml of the surfactant-nanotube dispersion to obtain the surfactant-nanotube-initiator mixture.

Styrene (99% purity, Aldrich) and isoprene (99% purity, Aldrich) monomers were provided. Inhibitors therein were removed by vigorously shaking a small volume of monomer (about 25 ml) with one gram of basic alumina (activity grade I, Sigma) in a 30-ml vial. To stabilize the system against micro-droplet coalescence and the Ostwald ripening effect, a hydrophobe (e.g., hexadecane) was mixed with the monomers prior to ultrasonication of the mixture. Further, seeding of the monomer with a PS-$AlCl_3$ acid complex (polymerization catalyst) was performed to induce higher monomer transformation rates and consequently better incorporation of the carbon nanotubes inside the matrix. 0.8 ml of hexadecane (99.8% purity, Fisher) was combined with 0.05 ml of PS-$AlCl_3$/hexadecane mixture in 4 ml of styrene to obtain the monomer-hydrophobe-polymerization catalyst mixture.

The monomer-hydrophobe-polymerization catalyst mixture was then combined with the surfactant-nanotube-initiator mixture forming a monomer-nanotube mixture which was shaken for 1 h at 200 cycles/min. Afterward, the monomer-nanotube mixture was sonicated for 60 s at room temperature with a Fisher 550 sonic dismembrator operating at the equipment amplitude setting of 5, forming a monomer-nanotube miniemulsion without any traces of carbon deposits or other particulates. Immediately after sonication the mixture was transferred to a constant temperature device operating at 65° C. until polymerization occurred, for example within 14 hr, forming the nanotube-filled composite, which could be precipitated for example by mixing with a large volume of pure isopropyl alcohol (J. T. Baker) wherein coagulation occurs.

SWNT-SI preparation followed a similar procedure as the SWNT-PS described above with the only difference that 2 ml of each monomer—styrene and isoprene—were used. After the reaction, polymerized nanotube-filled composite material was coagulated and instead of producing flocculated material as in the SWNT-PS, the larger SWNT-SI coagulates aggregated into a whitish rubbery solid. By way of comparison, the reference material (i.e., polystyrene and styrene-isoprene copolymer) was synthesized using the same surfactant solutions and procedures described above, obviously without adding the carbon nanotubes. In the case of the control polymers or reference materials, both cationic and anionic surfactants yielded polymers with similar characteristics.

Raman laser spectroscopy was used to probe the structure of the unmodified polymers, as well as the SWNT-PS and SWNT-SI composites. In all cases an excitation wavelength of 514 nm with 35 mW intensity served to scan the spectral range between 80 $cm^{-1}$ and 4000 $cm^{-1}$. Other experimental parameters were acquisition time (1 min) and lens power (50×). Sample analysis in the solid state was preferred over the alternative method of dissolving the polymeric specimen in a solvent and then casting it over a glass slide. The former procedure gave stronger signals and presented fewer fluorescence problems. For AC impedance measurements (SOLARTRON 1260 Impedance Analyzer) at room temperature, a two-probe geometry was employed. Disk-shaped parts of the SWNT-PS composite were compression-molded to different thicknesses and sandwiched between two polished copper electrodes (area=4.908 $cm^2$) held tight to the specimens by two flat polycarbonate plates. Fowler Associates Inc. (Moore, S.C.) carried out DC volume resistivity measurements in accordance with ASTM D-257, also on disk-shaped SWNT-PS molded specimens.

The SWNT-PS composite had a gray-bluish color, and after coagulation with isopropanol, decanted as a gray powder. This powder was filtered and washed several times with deionized water to remove any residual surfactant, and thereafter set overnight in a vacuum at 75° C. to drive off any unreacted monomer and moisture. With the drying operation the gray-colored powder turned into very hard black pellets. In contrast to the SWNT-PS, control samples of pure polystyrene were completely white after the drying period and had a characteristic powdery consistency. The initial load of nanotubes present in the surfactant-nanotube mixture is incorporated into the reacted polymeric phase as the wash solution with isopropyl alcohol was clear and did not show any black precipitate. Temperature programmed oxidation (TPO) measurements performed in SWNT-PS composites prepared with a starting surfactant-nanotube mixture with 1.2% nanotube weight showed a final loading of 8.5% weight of nanotubes in the nanotube-filled composite. A lower percentage of nanotubes in the surfactant solution will produce lower loadings in the composite.

A good indication of the high level of interaction of the polymer chains with the nanotubes in the nanotube-filled composite is that the complete dissolution of SWNT-PS composites in an organic solvent (toluene) forms a homogeneous dark dispersion for a period longer than three weeks.

Figure 1:
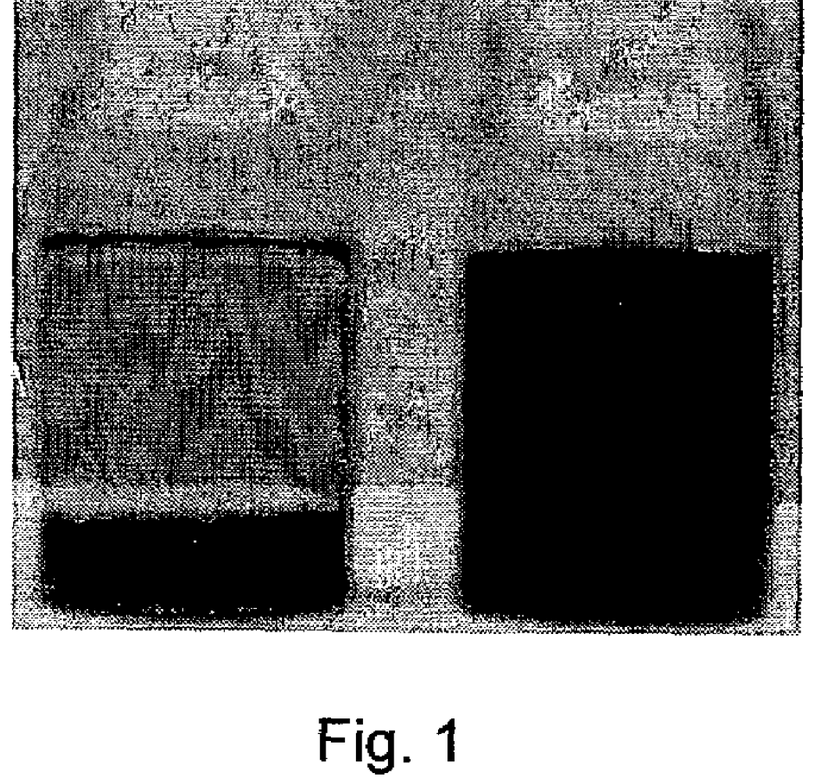
FIG. 1 shows a photomicrograph of samples of polystyrene and SWNTs codissolved in toluene (left vial) and SWNT-polystyrene composite (SWNT-PS) prepared according to the present invention and dissolved in toluene (right vial).
Figure 2:
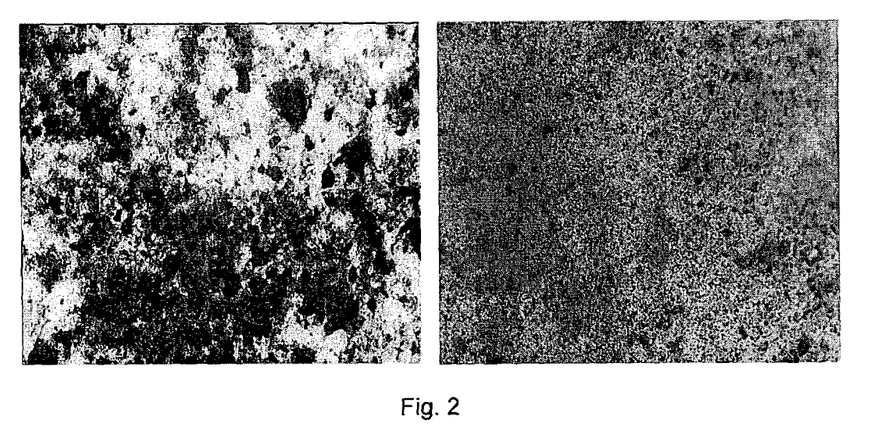
FIG. 2 shows 100× transmission light micrographs of 30 μm-thick cast-films containing 8–9% SWNTs. The micrograph on the left shows the simple polystyrene-SWNT mixture of the left vial of FIG. 1 after evaporation of the toluene therefrom, while the micrograph on the right corresponds to the SWNT-PS composite mixture in the right vial of FIG. 1 after evaporation of the toluene therefrom.

FIG. 1 shows samples of the composites dissolved in toluene. Each sample contains approximately the same amount of SWNTs. The control solution (left) made simply by dissolving polystyrene in toluene and then adding the nanotubes had a very dark appearance after sonication for 2 h; but after two days, black sediment and a clear solution separated. The sample on the right is SWNT-PS composite (8.5% loading) prepared according to the present invention then mixed with toluene. The SWNT-PS composite remained dissolved in toluene after more than three weeks. Nanotubes alone are insoluble in all known solvents, therefore to form a stable mixture, as described herein, each nanotube must be sterically stabilized by attached polymer chains that impede flocculation and depletion aggregation phenomena. Solvent-cast films prepared right after sonication with these same polymer-nanotube solutions (left-polystyrene plus nanotubes; right-SWNT-PS composite) also presented a completely different microstructure under transmitted light microscopy (FIG. 2), which is consistent with the attainment of higher dispersion of the inorganic reinforcement by the miniemulsion process. The film on the left demonstrates the formation of aggregates in the simple polystyrene-SWNT-toluene mixture.

The nanotube-filled styrene-isoprene composite (SWNT-SI) containing 0.6% weight of nanotubes was similar in color to the gray-bluish reacted polystyrene composite. However, the bigger clumps of the modified elastomer aggregated more easily following precipitation into a somewhat elastic whitish rubber. This solid piece changed appearance into an intense black after being immersed for five minutes in boiling water. The coloration was uniform over the entire specimen. Once washed and placed overnight in the vacuum oven at high temperature (75° C.), no changes in coloration were detected. The SWNT-SI was also completely soluble in toluene and THF for more than three weeks, which further indicates the existence of strong polymer-nanotube interactions in the composite. The pure styrene-isoprene copolymer control also had a rubbery consistency, but instead of turning black it became transparent after similar washes in boiling water followed by vacuum-oven drying.

Spectroscopy Results.

Figure 3:
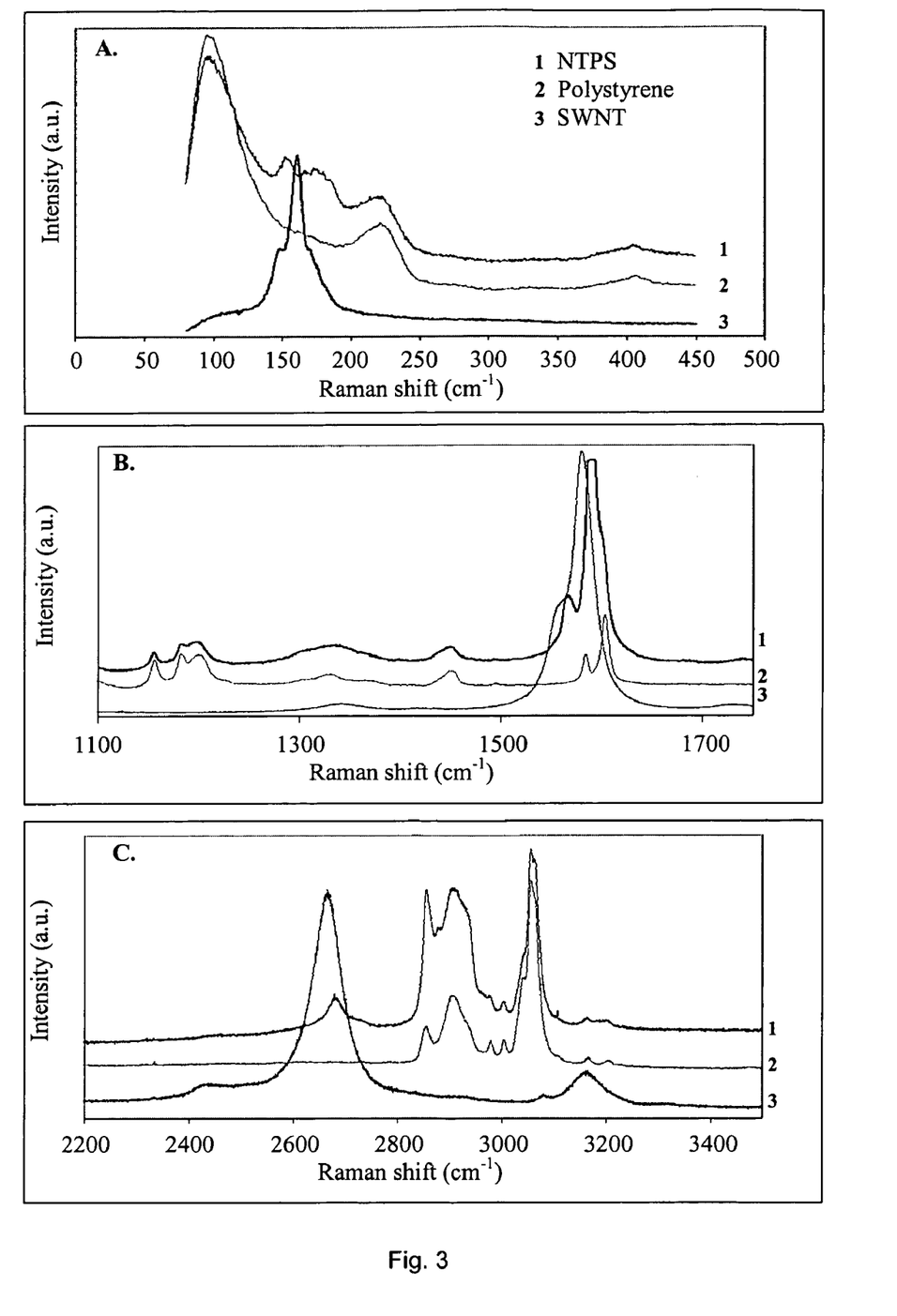
FIG. 3 shows the Raman spectra for (1) SWNT-PS, (2) polystyrene, and (3) SWNTs (obtained from CARBOLEX™) at (A) very low frequencies, (B) intermediate frequencies, and (C) higher frequencies.

Raman spectroscopy has been long recognized to be a powerful technique to probe the structure of polymers, especially those polymeric chains containing carbon—carbon double bonds. The same high resolution and versatility makes Raman analysis particularly important to study morphological and compositional parameters in SWNTs such as metallic characteristics, diameter, and presence of defects. In FIGS. 3A–3C, three different frequency regions of the control-polystyrene spectrum are compared to that of the SWNT-PS composite for an excitation wavelength of 514 nm. By way of example, the spectrum of the nanotube powder is also shown. At very low frequencies (FIG. 3A) the unmodified polymer shows a shoulder at 87 cm$^{-1}$ and a broad peak centered around 220 cm$^{-1}$. The first shoulder has been assigned in the literature to the benzene group twisting in the polymer chain, while the broader peak has been related to the tangential C—H bending mode[16]. It is interesting to note that no detectable changes in peaks location are apparent in the polymer as a result of the insertion of the nanotubes. In contrast, the breathing mode for the SWNTs shifts to lower frequencies while the initial sharp peak centered at 160 cm$^{-1}$ splits into two broader peaks of lower intensity. FIG. 3B corresponds to the intermediate frequencies region. Herein, the spectrum of polystyrene is dominated by two main peaks at 1584 cm$^{-1}$ and 1603 cm$^{-1}$ generally assigned to the tangential stretch mode of carbon—carbon bonds in the benzene ring. On the other hand, the so-called G-line feature centered at 1580 cm$^{-1}$ dominates the nanotube spectrum. In the composites, the introduction of SWNTs causes a shift of the G-line to higher frequencies as well as a clear predominance of the 1590 cm$^{-1}$ band. Similar results have been observed recently for nanotube-conjugated polymer composites, and it has been suggested that these changes may not be solely explained by a simple superposition of modes[5]. This phenomenon indicates an alteration of the vibrational structure of the polymer due to binding with the SWNT lattice. Raman spectroscopic analyses show that strong interactions between the nanotubes and the polymer chains take place, originating in much less vibrational freedom of the polymer. Finally, at higher frequencies (FIG. 3C) the polystyrene spectrum has two distinct peaks of appreciably large intensities around 2915 cm$^{-1}$ and 3058 cm$^{-1}$. The former band is identified in polystyrene as originated by C—H chain vibration (C—H stretch mode), while the second major peak is related to C—H radial stretch in the benzene ring. Note that no significant changes operate in the composite spectrum in the high-frequency region after the introduction of the nanotubes.

In general, the same changes within the vibrational structure of the SWNT-PS can be found for the SWNT-SI. Mostly these changes manifested in the C—C stretch region as a strong shifting towards a predominant peak located at the 1590 cm$^{-1}$ band. In addition, the characteristic vinyl or C=C stretching occurring as a very strong peak in the unmodified styrene-isoprene at 1670 cm$^{-1}$ band dramatically loses its intensity as a result of the carbon nanotube incorporation.

Electrical Properties.

Table 1 summarizes the data corresponding to DC electrical resistivity measurements for SWNT-PS composites at three different loadings.

TABLE 1

DC electrical resistivity data at room temperature (12% RH)

| POLYMER | THICKNESS (CM) | SWNT LOADING (%) | ρ (Ω-cm) |
| --- | --- | --- | --- |
| PS | 0.059 | 0 | >2 × 10$^{16}$ |
| SWNT-PS | 0.073 | 3.5–4 | >2 × 10$^{16}$ |
| SWNT-PS | 0.046 | 8.5 | 7.47 × 10$^{6}$ |

Figure 4:
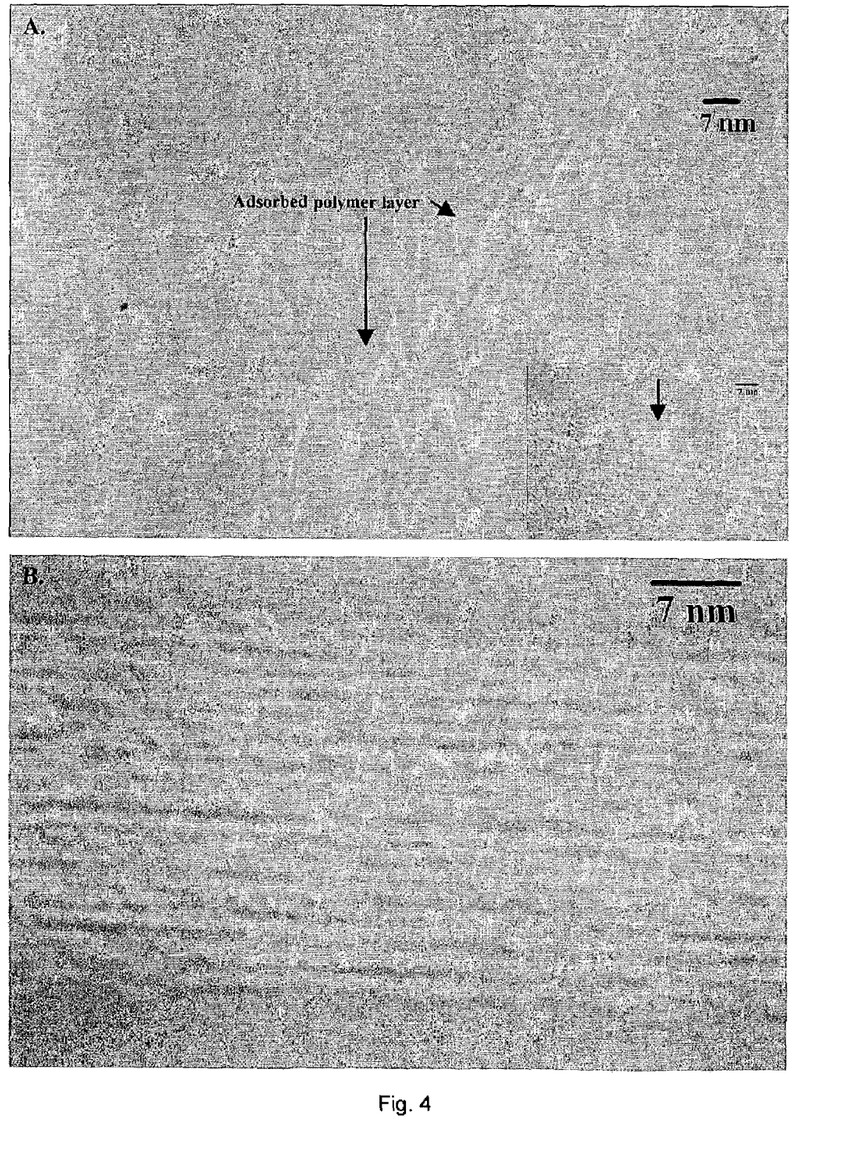
FIG. 4 shows a TEM (Transmission Electron Microscope) micrograph of SWNT-PS dissolved in toluene showing a layer of polymer adsorbed onto (A) the SWNT bundles, and (B) a TEM micrograph of bare CARBOLEX™ SWNTs.

The incorporation of the SWNTs inside the polymeric matrix brought about a substantial drop in the electrical resistivity from values greater than 10$^{16}$Ω-cm for the unmodified polymer down to 10$^{6}$Ω-cm in the SWNT-PS composites with 8.5% nanotube loading. These results are suggestive of a typical percolation system wherein the electrical properties of the composite would not be changed from those of the bulk polymer until the average distance between the nanotubes is reduced such that either electron tunneling through the polymer or physical contacts may be formed. At the highest nanotube loading tried (8.5%) the SWNT-PS composite shows a dramatically lower volume resistivity than that of the pure polystyrene. The origin of such smaller conductive capacity of the nanotube network can be attributed to the internal resistance of an adsorbed layer of polymer that reduces the number of electrical contacts[3]. In fact, TEM micrographs of SWNT-PS material dissolved in toluene showed evidence that a layer of polymer was adsorbed on the nanotube bundles (FIG. 4A). By way of comparison a micrograph of bare CARBOLEX(™) (batch CLAP 8256) single-walled carbon nanotubes is presented in FIG. 4B.

In other embodiments the carbon nanotube-filled composite may have an electrical resistivity of <$10^5$ Ω-cm or <$10^7$ Ωcm.

Figure 5:
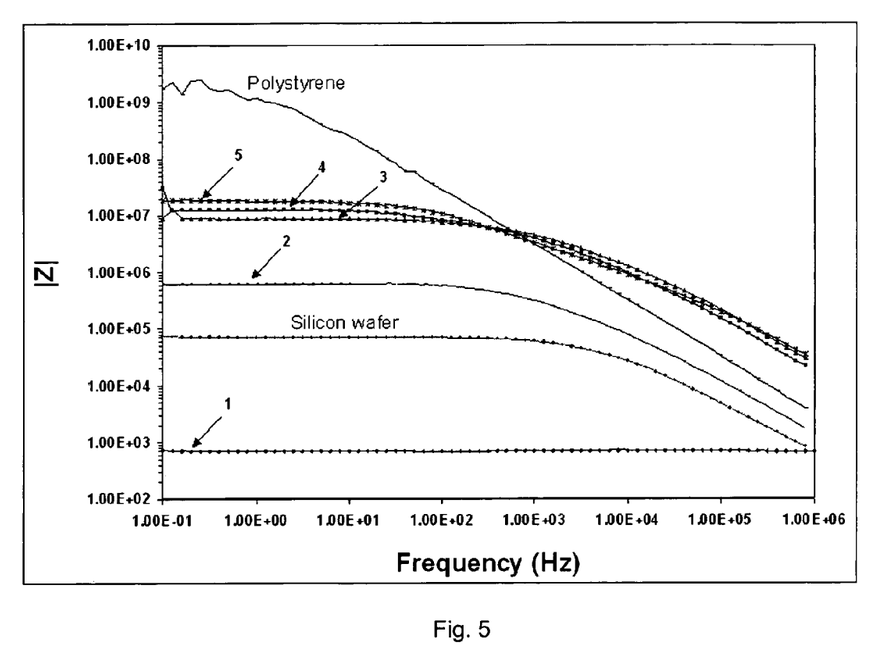
FIG. 5 shows a log—log plot of the impedance modulus for SWNT-PS composite wafers having various thicknesses: (1) 0.0276 cm; (2) 0.0462 cm; (3) 0.0857 cm; (4) 0.1891 cm; and (5) 0.2205 cm.

FIG. 5 shows a log—log plot of the impedance modulus, |Z|, with respect to frequency for different SWNT-PS composite (8.5% loading) disk-shaped molded wafers as well as two other reference materials: a typical insulator (polystyrene) and a semiconductor (silicon wafer, 0.98 mm thick). It is evident from these results that none of the SWNT composites display the ideal dielectric behavior exhibited by the pure polystyrene, and in contrast the samples range from pure semiconductor to clear ohmic behavior as the sample thickness decreases. For very thin samples (0.0276 cm) the frequency-independence of the impedance modulus is suggestive of an ohmic material that must posses a very well connected 3D nanotube network. As the sample thickness increases, an interconnected 3D net of nanotubes appears to become less well established. The apparent invariance of the impedance modulus with respect to sample thickness, as well as the transition towards a semiconductor behavior, can be explained by considering the electrical conductivity to occur as a result of nanotube connections present only at the surface.

Example 2

Preparation of SWNT-Filled Composite Using Catalyst-Supported SWNTs

SWNTs which are still associated with on a particulate catalyst material can also be used in the process of the present invention to form SWNT-filled composites. Such catalyst-supported SWNTs are known to those of ordinary skill in the art, for example, see U.S. Pat. Nos. 6,333,016 and 6,413,487, each of which is hereby expressly incorporated by reference herein in its entirety. Catalyst-supported SWNTs as contemplated herein may comprise metallic catalysts comprising one or more transition methods (e.g., Group VIb and/or VIII and/or lanthanides) disposed on a support material such as silica, alumina, molecular sieve zeolites, MCM-41, MgO, $ZrO_2$, or aluminum-stabilized magnesium oxides. The metallic catalysts are then exposed to a carbon-containing gas under appropriate conditions to form SWNTs upon the metallic catalysts to produce the catalyst-supported SWNTs which can then constitute the SWNT component of the present invention.

In the present embodiment, hydrophilic and hydrophobic forms of catalyst-supported SWNTs were used, the first comprising a hydrophilic silica as a support material and the second comprising a hydrophobic silica (hydrophilic silica made hydrophobic by a thermal treatment). The metallic catalyst associated with the silica in this embodiment was cobalt and molybdenum but other metallic components as described elsewhere herein could be used instead.

The hydrophobic catalyst-supported SWNTs (HO-SWNTs) and the hydrophilic catalyst-supported SWNTs (HI-SWNTs) were combined with styrene monomer to form HO-SWNT polystyrene composite (HO-SWNT-PS) or HI-SWNT polystyrene composite (HI-SWNT-PS) as described below.

Dispersions of the HO-SWNT and HI-SWNT (1.2% w.) were prepared in solution of CTAB 120 mM, and sonicated in a bath sonicator for 12 hours. The preparation of the solution of initiator was made with 1.5 g of 2.2'-azobisisobutyronitrile in 50 ml of ethanol. The solution of the initiator is preferably prepared at 30° C. in order to avoid precipitation. Mixing the styrene with 1 g of basic alumina, and shaking for 15 min at 200 rpm removed the inhibitors from the monomer. The preparation of the SWNT-composite followed the same procedure described above in Example 1. 32 ml of each surfactant-nanotube dispersion was mixed with the initiator solution keeping the temperature at 30° C. A previous solution prepared with 4 ml of styrene, 0.8 ml of hexadecane, and 0.05 ml of PS-$AlCl_3$/hexadecane was added to the surfactant-nanotube-initiator mixture. The final solution was shaken at 200 rpm for 1 h. After that, the solution was sonicated in a sonic dismembrator for one minute or until the mixture turned into a gray/bluish miniemulsion. The miniemulsion then was heated in a water bath/shaker device at 65° C. for 12 hours. The SWNT-composite obtained with this procedure can be precipitated by washing with isopropanol at 30–40° C. Filtration and washing with water will remove the traces of surfactant from the samples. Removal of the water, and other volatile compounds from the composite was performed in a vacuum oven at 70° C. for 12 h. During the miniemulsion polymerization procedure, some precipitation of the catalyst-supported SWNTs was observed.

Figure 6:
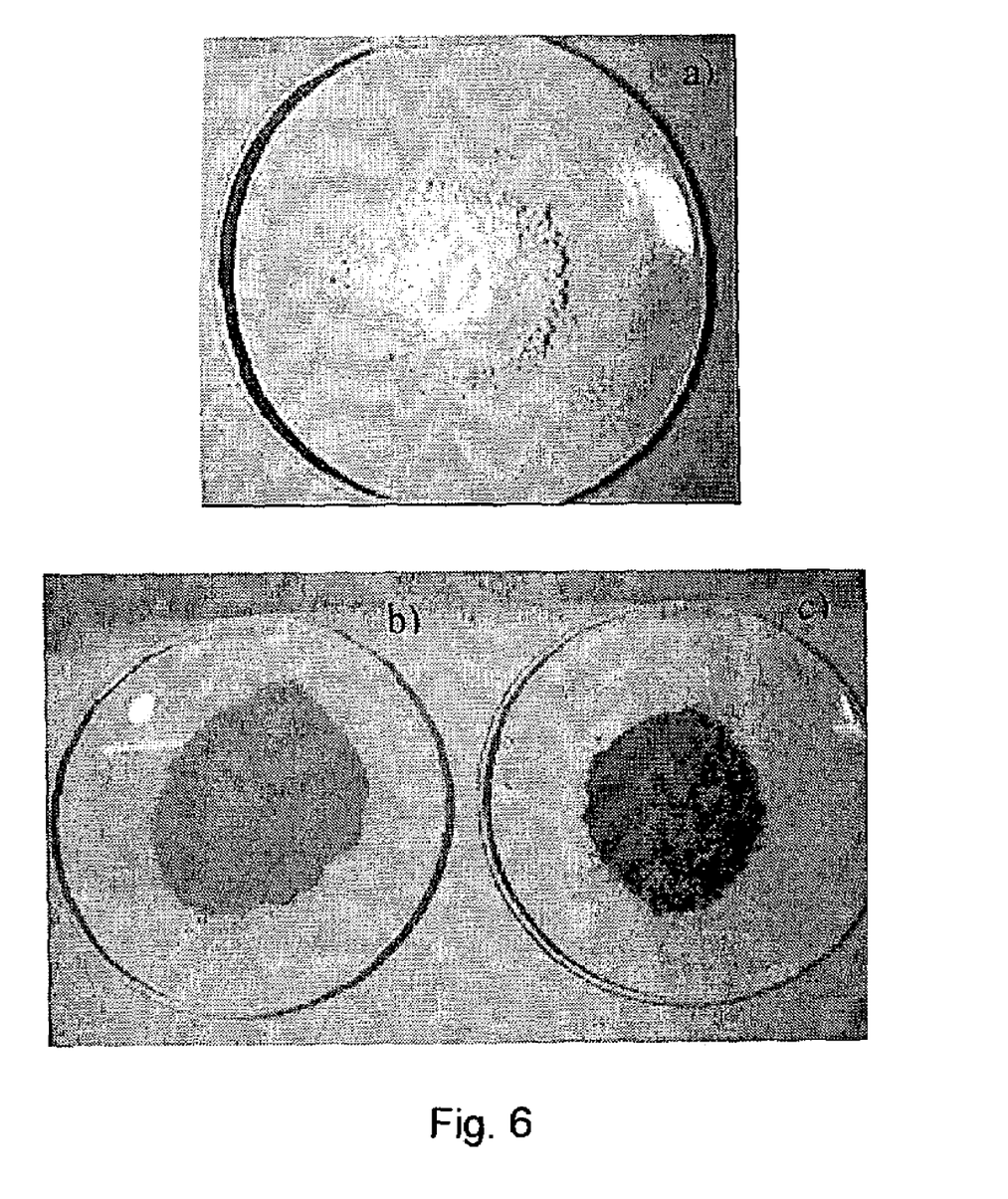
FIG. 6 shows (a) polystyrene, (b) SWNT-composites produced from hydrophobic catalyst-supported SWNTs (HO-SWNTs), and (c) hydrophilic catalyst supported SWNTs (HI-SWNTs).

Shown in FIG. 6 are the SWNT-composites obtained in Example 2. FIG. 6a shows the polystyrene prepared as the control sample using the same emulsion polymerization procedure. FIG. 6b shows the hydrophobic catalyst-supported SWNT composite (HO-SWNT-PS), which presents a lighter color than the hydrophilic catalyst-supported SWNT composite (HI-SWNT-PS) shown in FIG. 6c.

Figure 7:
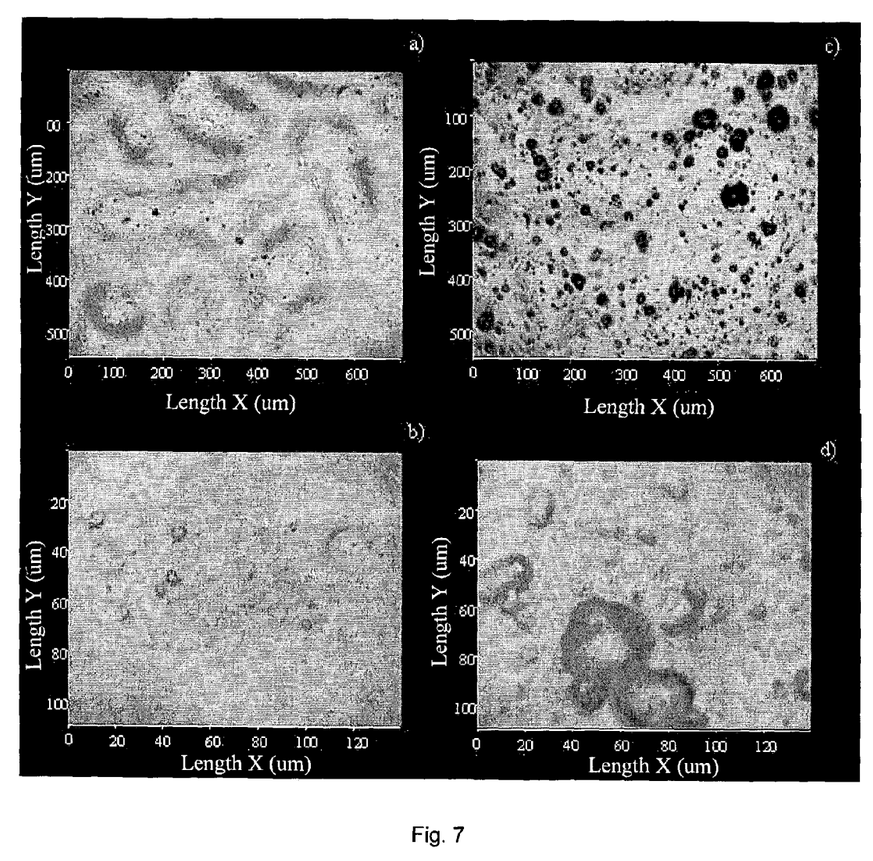
FIG. 7 shows photomicrographs of dispersions of the catalyst-supported SWNTs in the polystyrene polymer matrix (a) HI-SWNT-10x, (b) HI-SWNT-50x, (c) HO-SWNT-10x, and (d) HO-SWNT-50x.
Figure 8:
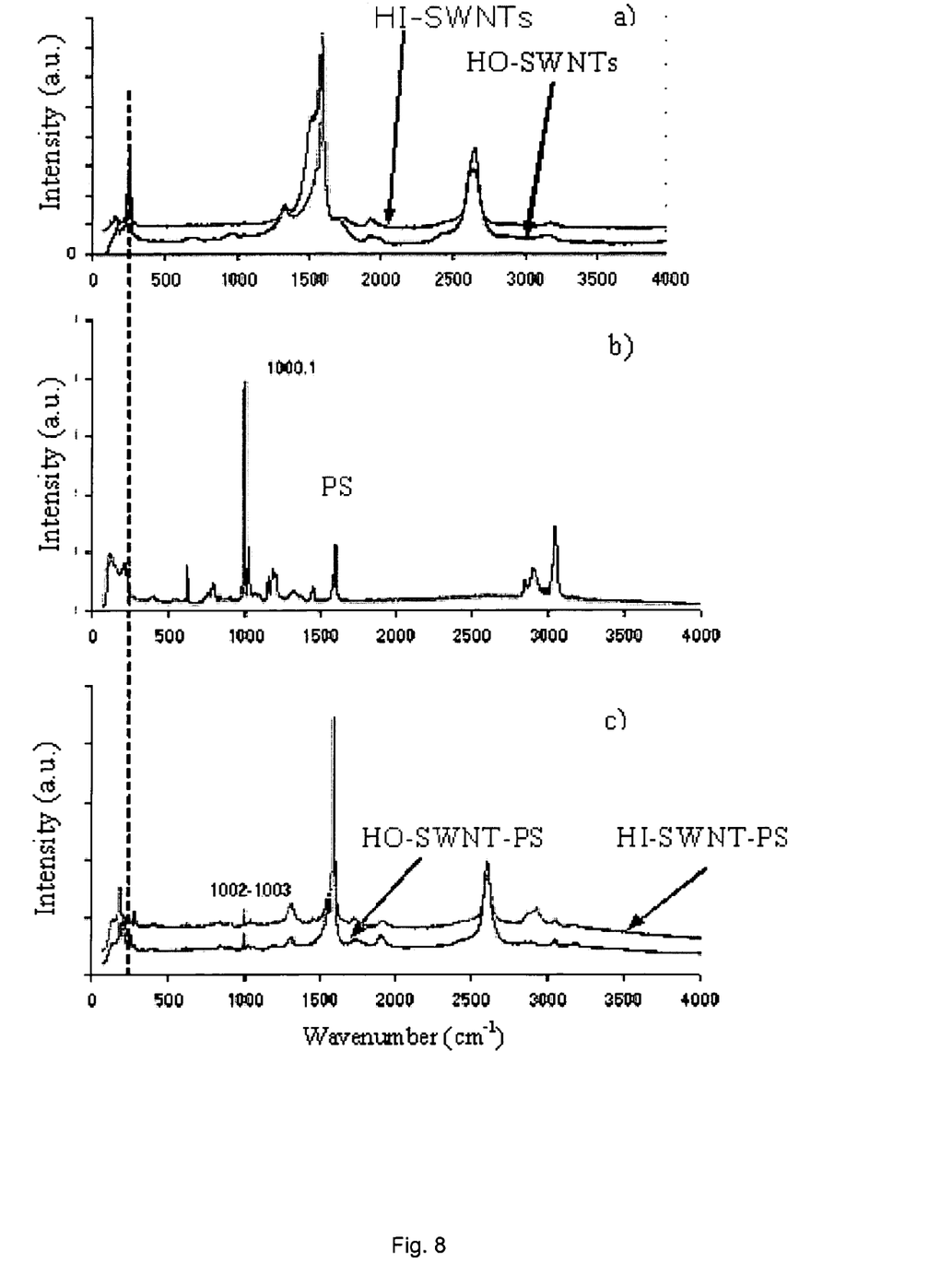
FIG. 8 shows Raman spectra of (a) HI-SWNTs and HO-SWNTs; (b) polystyrene; and (c) HI-SWNT polystyrene and HO-SWNT polystyrene composites.

FIG. 7 indicates that both types of catalyst-supported SWNTs are well dispersed in the polymer matrix, but the HI-SWNT-PS presents smaller and more homogeneous particles than the HO-SWNT-PS. Raman spectroscopy was used in order to observe the interaction of the HI-SWNT and HO-SWNT material with the polystyrene polymer matrix. FIGS. 8a–c shows the Raman spectrum of (a) the HO-SWNT and HI-SWNT material used as the filler, (b) the polystyrene prepared as the control sample, and the (c) HI-SWNT-PS and HO-SWNT-PS composites. In FIG. 8c it can be seen that the signal of the SWNT dominates the Raman spectra. While the band at around 1000 $cm^{-1}$ is the most intense feature in the spectrum of pure polystyrene (FIG. 8b) this band is very low in the composite due to the high intensity of the nanotube bands. Therefore, the bands in the region of the breathing mode (i.e., below 300 $cm^{-1}$) can only be due to the nanotubes because those due to polystyrene are insignificantly small. This interaction between the SWNTs and the polymer matrix is confirmed by the shift of the peaks corresponding to the breathing mode of the SWNT material (dotted line) to lower frequencies in the composite.

The present invention provides a method for providing carbon nanotube-doped thermoplastic and elastomeric composites prepared by a surfactant-enhanced miniemulsion polymerization technique. Polymerization occurs inside the micelle in the presence of nanotubes after the nanotubes have been introduced into the monomer mixture. Aggregate size in miniemulsion is approximately 50–500 nm versus 10–100 μm in regular emulsion polymerization. In the present invention, the aggregate size generated during the miniemulsion process is preferably primarily 50–125 nm, and more preferably primarily from 50–100 nm to 50–75 nm.

Cationic surfactants (e.g., CTAB) effectively dispersed the SWNTs. In the initial step, an aqueous surfactant and nanotube (SWNT) mixture is produced and sonicated for an appropriate duration until the nanotubes are well dispersed therein forming a surfactant-nanotube dispersion. The surfactant stabilizes the nanotubes by forming aggregates. Azo-isobutyronitrile (AIBN), or another effective polymerization initiator is then added to the surfactant-nanotube dispersion forming a surfactant-nanotube-initiator mixture for generating free radicals for polymerization. Single-walled carbon nanotubes may be modified by functionalization as described elsewhere herein or by other methods known in the art thereby making anionic, non-ionic and other cationic surfactants effective in dispersing the SWNTs within the monomer.

Separately, a monomer such as styrene (for forming a thermoplastic polymer) or more than one monomer such as styrene and isoprene (for forming an elastomeric copolymer) is combined with a hydrophobe, for example hexadecane to form a monomer-hydrophobe mixture. The hydrophobe may be any appropriate compound which inhibits premature micro-droplet coalescence and Ostwald ripening. Next, a polymerization catalyst, such as aluminum chloride, for serving as "seeds" or nucleation points for polymerization is added to the monomer-hydrophobe mixture to form a monomer-hydrophobe-polymerization catalyst mixture.

The surfactant-nanotube-initiator mixture is then combined with the monomer-hydrophobe-polymerization catalyst mixture and is shaken for an appropriate time, for example at 200 cycles/minute for 1 hour forming a monomer-nanotube mixture which is then treated with a sonic dismembrator for an appropriate time at an appropriate frequency, which further disperses the nanotubes within the polymer forming the monomer-nanotube miniemulsion which is then introduced into a "low-shaking" device and is shaken, for example, for 12–14 hours at 60–65° C. to allow polymerization. After 12–14 hours, the emulsion has polymerized to form the carbon nanotube-filled composite, which may have a milky "latex" consistency. This latex can be used, for example, as a paint or it can be coagulated, e.g., by adding an alcohol, wherein the surfactant goes into the alcohol leaving the nanotube composite as a precipitate. The styrene-isoprene (elastomer) copolymer process is done by the same procedure, and but rather forms a rubber coagulate. The method described herein could also be done using hydrophilic polymers and miniemulsion.

Example 3

In Situ Polymerization

Purified SWNT or "as-produced" SWNTs still associated with at least a portion of the catalytic material used for their production can be selectively tailored for in situ polymerization of specific polymers by adding an active agent to either the SWNT or the bare catalyst before the nanotubes are produced. For example, SWNT/$SiO_2$ composites can be doped with chromium to make it active for in situ polymerization of ethylene. It was verified that the quality of the SWNT produced is not affected by the presence of the chromium on the catalyst. Polyethylene produced with Phillips Cr/$SiO_2$ catalysts represents 20% of the worldwide production of polyethylenes. Since this catalyst needs to be activated under CO at high temperatures to be effective for polymerization, SWNT composites doped with chromium can be already active for ethylene polymerization after the growth of the nanotubes by CO disproportionation. In fact, during the growth of SWNT, the catalyst is treated under pure CO at high temperatures. Therefore, if the as-produced SWNT/Cr doped catalyst is exposed to ethylene polymerization conditions (e.g., 160° C. under ethylene flow at atmospheric pressure) immediately after their production, a SWNT/$SiO_2$/polyethylene composite is obtained.

The present invention may use, but is not limited to, the following equipment: a High-Pressure homogenizer (e.g., Christison Scientific M-110L Laboratory Microfluidizer Processor); Microfluidizer (e.g., MFIC-Microfluidics Co. HC-2000); an Ultrasonicator (e.g., Fisher 550 sonic dismembrator).

The present invention may use, but is not limited to use of, the following monomers: styrene, isoprene, vinyl benzyl chloride (VBC), vinyl chloride, vinyl acetate, acrylamide (AM), acrylonitrile (AN), acrylic acid (AA), methacrylates, e.g., methyl methacrylate (MMA), butyl methacrylate (BuA), lauryl methacrylate (LMA), dodecyl methacrylate (DMA), and stearyl methacrylate (SMA), epoxy resins (diamine/diepoxide), and combinations thereof.

The present invention may use, but is not limited to use of, the following surfactants: sodium dodecyl sulfate (SDS), and sodium lauryl sulfate (SLS), sodium dodecylbenzene sulfonate (NaDDBS), cetyltrimethyl ammonium bromide (CTAB), octadecylpyridinium bromide (ODPB), poly(ethylene oxide) derivatives such as nonylphenol polyethoxylate (NP-40), polyvinyl alcohol (PVOH), tergitol, and combinations thereof, as mixed surfactant solutions.

The present invention may use, but is not limited to use of, the following polymerization initiators: lauroyl peroxide (LPO), cumyl peroxide (CUPO), benzoyl peroxide (BPO), sodium persulfate (NaPS) and potassium persulfate (KPS), 2,2'-azobiisobutyronitrile (AIBN), 2,2'-azobis(2-methylpropionamidine) dihydrochloride (V50).

The present invention may use, but is not limited to use of, the following hydrophobes: cetylalcohol (CA), siloxanes, fluorinated alkanes, isocyanates, hexadecane, olive oil, and combinations thereof as to obtain the least solubility in water.

The present invention may use, but is not limited to use of, the following "seeding materials": polystyrene-$AlCl_3$, PMMA (polymethyl methacrylate)-$AlCl_3$, or any monomer or combination of monomers amenable to complexation with acid catalysts.

The SWNT composites produced by the methods described herein have improved properties due to more complete dispersion of the nanotubes. High dispersion of nanotubes in the polymer is necessary for the nanotube-polymer mixture to have improved mechanical properties. Utilities of the SWNT-composites of the present invention include, but are not limited to, shields for electromagnetic radiation, paintable plastics, anisotropic heat transfer (differentially conductive) materials, and reinforcement of other polymers or ceramics.

In order to make ceramics, for example, the SWNT composite can be put into a ceramic or metal and then the polymer is melted out leaving the nanotubes therein when the ceramic or metal is formed or shaped.

Similarly, SWNT-filled composites can be used in a "melt blowing" or "spin bonding" process. The SWNT-filled composite is combined with the melt blow polymer during the melt-blowing or spin-bonding process (preferably rather than being used itself alone in melt-blowing or spin-bonding) because the SWNT-filled composite is more compatible with the polymer than nanotubes alone.

The SWNT polymer composites formed using the present method have a lower electrical resistance than pure polymers, or composites having a similar total nanotube content which are not formed using miniemulsion polymerization. For example, SWNT-filled composites that have 8.5% nanotubes by weight when formed using the present method exhibit a 10-fold or more reduction in electrical resistance over nanotube/polymer mixtures having a 3.5–4.0% loading.

Other utilities for the SWNT-filled composites described herein will be readily evident to persons of ordinary skill in the art and the list herein of uses for the present SWNT-filled composites is not intended to be exhaustive.

The present invention is not to be limited in scope by the specific embodiments described herein, since such embodiments are intended as but single illustrations of one aspect of the invention and any functionally equivalent embodiments are within the scope of this invention. Indeed, various modifications of the invention in addition to those shown and described herein will become apparent to those skilled in the art from the foregoing description and accompanying drawings.

REFERENCES

1. Franco, R W A; Donoso, J. P.; Magon, C. J.; Rodella, C. B.; Florentino, A. O.; Saeki, M. J.; Pernaut, J. M.; de Oliveira, A. L. *Solid State Ionics* 1998, 115, 149
2. Qian, D.; Dickey, E. C.; Andrews, R. and Rantell, T. *Appl. Phys. Lett.* 2000, 76, 2868
3. Shaffer, M. S. P.; Windle, A. H. *Adv. Mater.* 1999, 11, 937
4. Jin, L.; Bower, C.; Zhou, O. *Appl. Phys. Lett.* 1998, 73, 1197
5. Bower, C.; Rosen, R.; Jin, L.; Han, J.; Zhou, O. *Appl. Phys. Lett.* 1999, 74, 3317
6. McCarthy, B.; Coleman, J. N.; Czerw, R.; Dalton, A. B.; In het. Panhius, M.; Maiti, A.; Drury, A.; Bernier, P.; Nagy, J. B.; Lahr, B.; Byrne, H. J.; Carroll, D. L.; Blau, W. J. *J. Phys. Chem. B.* 2002, 106, 2210
7. Gong, X. G.; Liu, J.; Baskaran, S.; Voise, R. D.; Young, J. S. *Chem. Mater.* 2000, 12, 1049
8. Tiarks, F.; Ladfester, K.; Antonietti, M. *Macromol. Chem. Phys.* 2001, 202, 51
9. Landfester, K. *Macromol. Rapid Commun.* 2001, 22, 896
10. Landfester, K. *Adv. Mater.* 2001, 13, 765
11. Tiarks, F.; Ladfester, K.; Antonietti, M. *Langmuir* 2001, 17, 5775
12. Deng, J. G; Ding, X. B.; Peng, Y. X.; Chan, A. S. C. *Chinese Chem. Lett.* 2001, 12, 1037
13. Hwang. G/L/; Hwang, K. C. *J. Mater. Chem.* 2001, 11, 1722
14. Pompeo, F.; Resasco, D. *Nanoletters* 2002, 2, 369
15. Anderson, C. D.; Sudol, D. E.; El-Asser, M. S. *Macromolecules* 2002, 35, 574
16. Sears, W. M.; Hunt, J. L.; Stevens, J. R. *J. Chem. Phys.* 1981, 75, 1589

Each of the references listed herein is hereby expressly incorporated by reference herein in its entirety.

What is claimed is:

1. A method of preparing a carbon nanotube-filled composite, comprising:
    combining a quantity of single-walled carbon nanotubes with an aqueous surfactant to form a surfactant-nanotube mixture;
    sonicating the surfactant-nanotube mixture to form a surfactant-nanotube dispersion;
    combining a polymerization initiator with the surfactant-nanotube dispersion to form a surfactant-nanotube-initiator mixture;
    combining a quantity of a monomer with a quantity of a hydrophobe to form a monomer-hydrophobe mixture;
    combining a polymerization catalyst with the monomer-hydrophobe mixture to form a monomer-hydrophobe-polymerization catalyst mixture;
    combining the surfactant-nanotube-initiator mixture with the monomer-hydrophobe-polymerization catalyst mixture to form a monomer-nanotube mixture; and
    sonicating the monomer-nanotube mixture causing formation of a monomer-nanotube miniemulsion within which polymerization occurs thereby forming the carbon nanotube-filled composite.

2. The method of claim 1 wherein in the step of combining a quantity of single-walled carbon nanotubes, the single-walled carbon nanotubes are functionalized.

3. The method of claim 1 wherein in the step of combining a quantity of single-walled carbon nanotubes, the single-walled carbon nanotubes are associated with a catalyst material comprising at least a portion of the catalyst material used for their growth.

4. The method of claim 3 wherein the catalyst material comprises a metal selected from Group VIb and a metal selected from Group VIII.

5. The method of claim 4 wherein the catalyst material comprises Co and Mo.

6. The method of claim 3 wherein the catalyst material comprises a support material selected from the group consisting of silica, alumina, molecular sieve zeolites, MCM-41, MgO, $ZrO_2$, and aluminum-stabilized magnesium oxides.

7. The method of claim 3 wherein the catalyst material comprises a hydrophilic silica or a hydrophobic silica as a support material.

8. The method of claim 1 wherein in the step of combining a quantity of single-walled carbon nanotubes with an aqueous surfactant, the aqueous surfactant is cationic, anionic, or non-ionic.

9. The method of claim 8 wherein the surfactant is at least one of sodium dodecyl sulfate (SDS), sodium lauryl sulfate (SLS), sodium dodecylbenzene sulfonate (NaDDBS), cetyltrimethyl ammonium bromide (CTAB), octadecylpyridinium bromide (ODPB), poly(ethylene oxide) derivatives such as nonylphenol polyethoxylate (NP-40), polyvinyl alcohol (PVOH), tergitol, or combinations thereof.

10. The method of claim 1 wherein in the step of combining a polymerization initiator, the polymerization initiator is at least one of lauroyl peroxide (LPO), cumyl peroxide (CUPO), benzoyl peroxide (BPO), sodium persulfate (NaPS) and potassium persulfate (KPS), 2,2'-azobiisobutyronitrile (AIBN), or 2,2'-azobis(2-methylpropionamidine) dihydrochloride (V50).

11. The method of claim 1 wherein in the step of combining a quantity of monomer with a hydrophobe, the monomer is at least one of styrene, isoprene, vinyl benzyl chloride (VBC), vinyl chloride, vinyl acetate, acrylamide (AM), acrylonitrile (AN), acrylic acid (AA), methacrylates, e.g., methyl methacrylate (MMA), butyl methacrylate (BuA), lauryl methacrylate (LMA), dodecyl methacrylate (DMA), and stearyl methacrylate (SMA), epoxy resins (diamine/diepoxide), or combinations thereof.

12. The method of claim 1 wherein in the step of combining a quantity of monomer with a hydrophobe, the hydrophobe is at least one of cetylalcohol (CA), siloxanes, fluorinated alkanes, isocyanates, hexadecane, olive oil, or combinations thereof.

13. The method of claim 1 wherein in the step of combining a polymerization catalyst, the polymerization catalyst is $AlCl_3$.

14. The method of claim 1 wherein in the step of sonicating the monomer-nanotube mixture causing the formation of a monomer-nanotube miniemulsion, the monomer-nanotube miniemulsion primarily comprises aggregates having diameters of 50–500 nm.

15. The method of claim 14 wherein the aggregates primarily have diameters of 50–125 nm.

16. The method of claim 15 wherein the aggregates primarily have diameters of 50–100 nm.

17. The method of claim 1 wherein the carbon nanotube-filled composite has an electrical resistivity of less than $10^5 \Omega$-cm.

18. The method of claim 1 wherein the carbon nanotube-filled composite has an electrical resistivity of less than $10^7 \Omega$-cm.

19. A method of forming a carbon nanotube-filled composite, comprising combining single-walled carbon nanotubes with a single monomer or two or more different monomers in a single hydrophobe to form a nanotube-monomer mixture and exposing the nanotube-monomer mixture to polymerization conditions wherein the polymerization of the monomer or monomers occurs in the presence of the single-walled carbon nanotubes to form the carbon nanotube-filled composite.

20. A method of forming a carbon nanotube-filled composite, comprising combining single-walled carbon nanotubes with a monomer to form a nanotube-monomer mixture wherein the single-walled carbon nanotubes are still associated with a catalytic material upon which the single-walled carbon nanotubes are grown, and exposing the nanotube-monomer mixture to polymerization conditions wherein the polymerization of the monomer occurs in the presence of the single-walled carbon nanotubes to form the carbon nanotube-filled composite comprising the catalytic material.

21. A method of forming a carbon nanotube-filled composite, comprising combining single-walled carbon nanotubes with a monomer to form a nanotube-monomer mixture wherein the single-walled carbon nanotubes are still associated with a catalytic material upon which the single-walled carbon nanotubes are grown, and exposing the nanotube-monomer mixture to polymerization conditions wherein the polymerization of the monomer occurs in the presence of the single-walled carbon nanotubes to form the carbon nanotube-filled composite comprising the catalytic material, wherein the catalytic material comprises a metal selected from Group VIb and a metal selected from Group VIII.

22. A method of forming a carbon nanotube-filled composite, comprising combining single-walled carbon nanotubes with a monomer to form a nanotube-monomer mixture wherein the single-walled carbon nanotubes are still associated with a catalytic material upon which the single-walled carbon nanotubes are grown, and exposing the nanotube-monomer mixture to polymerization conditions wherein the polymerization of the monomer occurs in the presence of the single-walled carbon nanotubes to form the carbon nanotube-filled composite comprising the catalytic material, wherein the catalytic material comprises Co and Mo.

23. A method of forming a carbon nanotube-filled composite, comprising combining single-walled carbon nanotubes with a monomer to form a nanotube-monomer mixture wherein the single-walled carbon nanotubes are still associated with a catalytic material upon which the single-walled carbon nanotubes are grown, and exposing the nanotube-monomer mixture to polymerization conditions wherein the polymerization of the monomer occurs in the presence of the single-walled carbon nanotubes to form the carbon nanotube-filled composite comprising the catalytic material, wherein the catalytic material comprises a support material selected from the group consisting of silica, alumina, molecular sieve zeolites, MCM-41, MgO, $ZrO_2$, and aluminum-stabilized magnesium oxides.

24. A method of forming a carbon nanotube-filled composite, comprising combining single-walled carbon nanotubes with a monomer to form a nanotube-monomer mixture wherein the single-walled carbon nanotubes are still associated with a catalytic material upon which the single-walled carbon nanotubes are crown, and exposing the nanotube-monomer mixture to polymerization conditions wherein the polymerization of the monomer occurs in the presence of the single-walled carbon nanotubes to form the carbon nanotube-filled composite comprising the catalytic material, wherein the catalytic particle comprises precipitated silica or or fumed silica or a combination thereof as a support material.

25. A carbon nanotube-filled composite produced by the method of claim 20, the carbon nanotube-filled composite comprising catalytic material used to grow the single-walled carbon nanotubes and wherein the catalytic material is selected from the group consisting of a Group VIb metal and a Group VIII metal supported on a support material selected from the group consisting of silica, precipitated silica, fumed silica, alumina, molecular sieve zeolites, MCM-41, MgO, $ZrO_2$, and aluminum-stabilized magnesium oxides.

26. A method of preparing a carbon nanotube-filled composite, comprising:
combining a quantity of single-walled carbon nanotubes with an aqueous surfactant to form a surfactant-nanotube mixture, wherein the single-walled carbon nanotubes are still associated with a catalytic material upon which the single-walled carbon nanotubes are grown;
sonicating the surfactant-nanotube mixture to form a surfactant-nanotube dispersion;
providing a monomer;
providing a polymerization catalyst;
providing a polymerization initiator; and
combining the surfactant-nanotube dispersion with the monomer, polymerization catalyst, and polymerization initiator under polymerization conditions to cause in-situ polymerization of the monomer with the single-walled carbon nanotubes forming the carbon nanotube-filled composite.

27. The method of claim 26 wherein in the step of combining a quantity of single-walled carbon nanotubes, the single-walled carbon nanotubes are functionalized.

28. The method of claim 26 wherein the catalytic material comprises a metal selected from Group VIb and a metal selected from Group VIII.

29. The method of claim 26 wherein the catalytic material comprises Co and Mo.

30. The method of claim 26 wherein the catalytic material comprises a support material selected from the group consisting of silica, alumina, molecular sieve zeolites, MCM-41, MgO, $ZrO_2$, and aluminum-stabilized magnesium oxides.

31. The method of claim 26 wherein the catalytic material comprises a hydrophilic silica or a hydrophobic silica as a support material.

32. A carbon nanotube-filled composite comprising a polymeric material and single-walled carbon nanotubes and comprising catalytic material used to grow the single-walled carbon nanotubes.

* * * * *

UNITED STATES PATENT AND TRADEMARK OFFICE
CERTIFICATE OF CORRECTION

| | | |
|---|---|---|
| PATENT NO. | : 7,153,903 B1 | Page 1 of 1 |
| APPLICATION NO. | : 10/464041 | |
| DATED | : December 26, 2006 | |
| INVENTOR(S) | : Harry J. Barraza et al. | |

It is certified that error appears in the above-identified patent and that said Letters Patent is hereby corrected as shown below:

In the Specification:

Column 1, line 47: Delete "(NTS)" and replace with --(NTs)-- .

In the Claims:

Column 16, line 10: Delete "crown" and replace with -- grown -- .
          line 16: Before the word "fumed" delete "or" .

Signed and Sealed this

Twentieth Day of March, 2007

JON W. DUDAS
*Director of the United States Patent and Trademark Office*